US006824641B2

(12) United States Patent
Tirinnanzi

(10) Patent No.: US 6,824,641 B2
(45) Date of Patent: Nov. 30, 2004

(54) PROCESS FOR BEVELLING WOOD-CHIP BOARDS OR BOARDS OF SIMILAR MATERIAL AND BEVELLED BOARDS THEREBY OBTAINED

(75) Inventor: Lorenzo Tirinnanzi, Legnano Mi (IT)

(73) Assignee: Sacea S.p.A. (IT)

( * ) Notice: Subject to any disclaimer, the term of this patent is extended or adjusted under 35 U.S.C. 154(b) by 4 days.

(21) Appl. No.: 10/261,008

(22) Filed: Sep. 30, 2002

(65) Prior Publication Data

US 2003/0066598 A1 Apr. 10, 2003

(30) Foreign Application Priority Data

Oct. 5, 2001 (IT) .................................... MI2001A2064

(51) Int. Cl.[7] ................................................ B32B 31/00

(52) U.S. Cl. ....................... 156/257; 265/268; 265/298; 265/299; 265/293; 265/211; 144/349; 144/350; 144/352; 144/355

(58) Field of Search ................................ 156/257, 265, 156/268, 298, 299, 293, 211; 144/349, 350, 352, 355; 428/182, 191, 211

(56) References Cited

U.S. PATENT DOCUMENTS 1,572,247 A * 2/1926 Rockwell .................... 144/350
2,184,970 A * 12/1939 Allen ......................... 428/157
3,959,538 A * 5/1976 Loew .......................... 428/31
3,970,498 A * 7/1976 Loew ......................... 156/211
3,998,679 A * 12/1976 Gwynne ...................... 156/42
4,083,160 A * 4/1978 MacDonald et al. .......... 52/136
4,612,078 A * 9/1986 Karp .......................... 156/493
5,310,435 A * 5/1994 Kelly ......................... 156/182
5,540,026 A * 7/1996 Gartland ...................... 52/455
5,653,080 A * 8/1997 Bergeron ................... 52/729.4

* cited by examiner

*Primary Examiner*—Linda Gray
(74) *Attorney, Agent, or Firm*—Muserlian, Lucas & Mercanti, LLP

(57) ABSTRACT

The present invention relates to a process for bevelling an edge of a wood-chip board (1) or a board of similar material, and the bevelled board thereby obtained. The process includes the operative steps of:

Figure 1A:
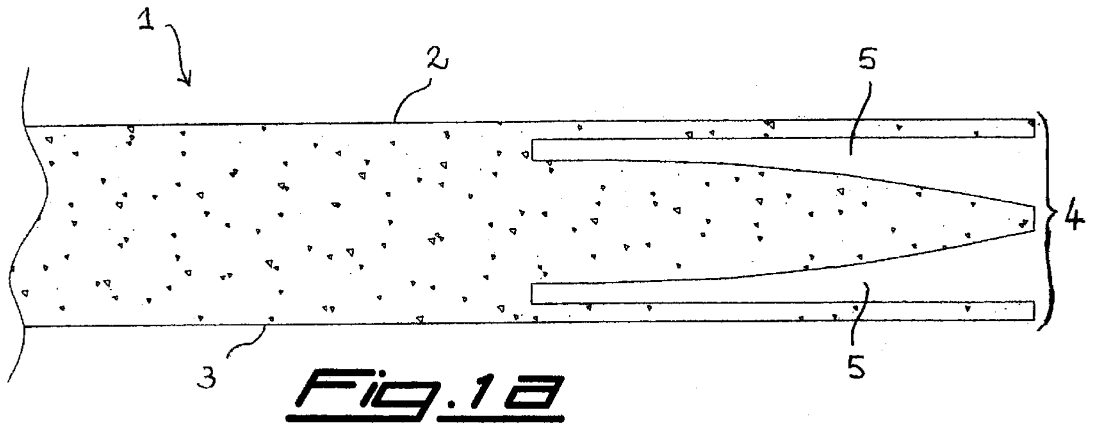

making at least two grooves (5) along a whole area to be bevelled of the edge of the board (1), the grooves (5) being substantially parallel to each other and to the faces (2, 3) of the board (1) and having a thickness increasing toward the exterior of the board (1);

introducing into each groove (5) an insert (6) of uniform thickness equal to a minimum thickness of the same groove (5); and pressing and gluing the walls of the grooves (5) on inserts (6).

5 Claims, 2 Drawing Sheets

PROCESS FOR BEVELLING WOOD-CHIP BOARDS OR BOARDS OF SIMILAR MATERIAL AND BEVELLED BOARDS THEREBY OBTAINED

This patent application claims a benefit of priority from Italian Patent Application No. MI2001A002064 filed Oct. 5, 2001, the contents of which is incorporated herein by reference.

The present invention relates to a process for bevelling the edges of wood-chip boards or boards of similar material and the bevelled boards thereby obtained.

It is known that one of the best materials for manufacturing furnishing elements is wood-chip material because of resistance and cheapness thereof. This material is formed of wood fragments pasted with a synthetic resin based binder and pressed in such a way to obtain boards. These boards can then be coated by laminated plastic or valuable wood imitating melamine papers.

The boards can further be subjected to further workings for bevelling the edges so as to obtain furniture of greater aesthetic value. In particular, bevelled boards are especially required by office furniture manufacturer, for example for manufacturing desk-tops, wherein the bevelling of the edge attenuates the contact with the user thus producing a pleasant sensation of softness.

However, many of the known processes make it possible to obtain only bevelled chip boards having a polygonal profile, useable for desks of traditional type and not for the more modem ergonomic desks which use tops provided with at least one curved side, that is the one corresponding to the user position.

To obtain a bevelling on chip boards having curved sides it is possible to manufacture separately a bevelled edge of polymeric material, generally polyurethane or PVC, to be applied to the side of said boards.

However, in the case that polyurethane is used, the resulting product has a high production cost since this material has to be molded with moulds fitting the curvings of the sides of the board. Hence, to obtain the edge of a board, it is necessary to produce many elements which, assembled together, reproduce the curvings of the board itself, or to carry out a mould for each curving. However, for this purpose a plurality of moulds are necessary which successively cannot be used again for edging boards of different curving.

On the other hand, if to reduce the production costs a bevelled edge in soft PVC is used, adaptable to the curving of sides of any board, other disadvantages occur and in particular the reduced curving available, the risk for the health of the user due to the contact with PVC and the fact that a clear division line is produced between the sides of the board and the edge applied thereto, with possible deposits of dirtiness.

Other possible known bevelling processes can be applied only to boards formed of medium density fibres (MDF boards).

Among these, a first process consists in bevelling the sides of the boards through a pantograph and in successively superficial finishing of the board, which must necessarily be effected through painting with high resistance paints. However, painting is an expensive as well as polluting operation and moreover the above said paints form a worse coating than the melamine papers, both from qualitative and aesthetic point of view.

Alternatively, MDF boards already coated by melamine papers can be bevelled in proximity to the sides, but this operation obviously causes the removal of the coating and therefore it can be made only on the lower face of the board which then remains unfinished. Consequently, boards get thin at the edges but the desired effect, that is the sensation of softness in the contact between the user and the furniture, is not obtained.

The object of the present invention is therefore to provide a process for bevelling wood-chip boards or boards of similar material, which is free from said drawbacks. Said object is achieved with a process whose main features are disclosed in the first claim and other features are disclosed in the following claims.

An advantage of the process according to the present invention consists in that it allows the obtaining of wood-chip boards or boards of similar material, bevelled on both faces, of any shape and without applied edges.

Another advantage of the process according to the present invention lies in the execution simplicity and in the cheapness thereof.

Figure 1B:
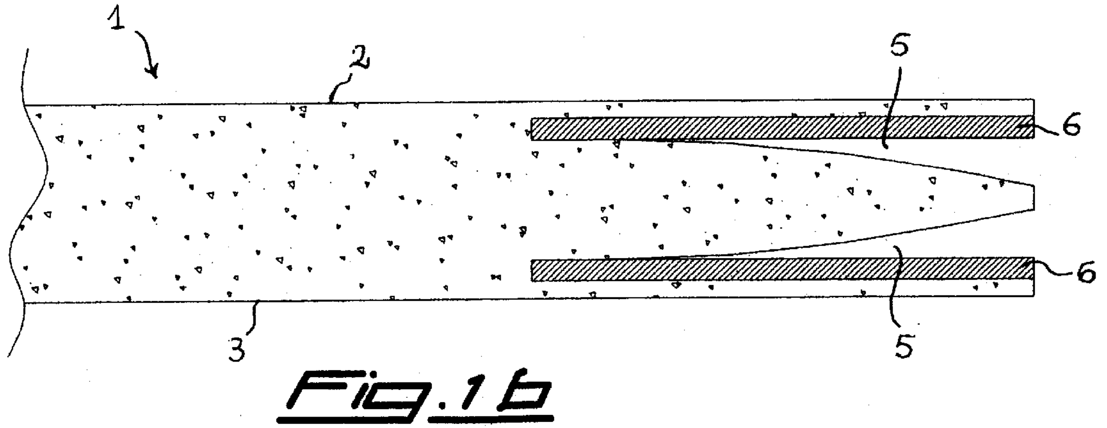
Figure 1C:
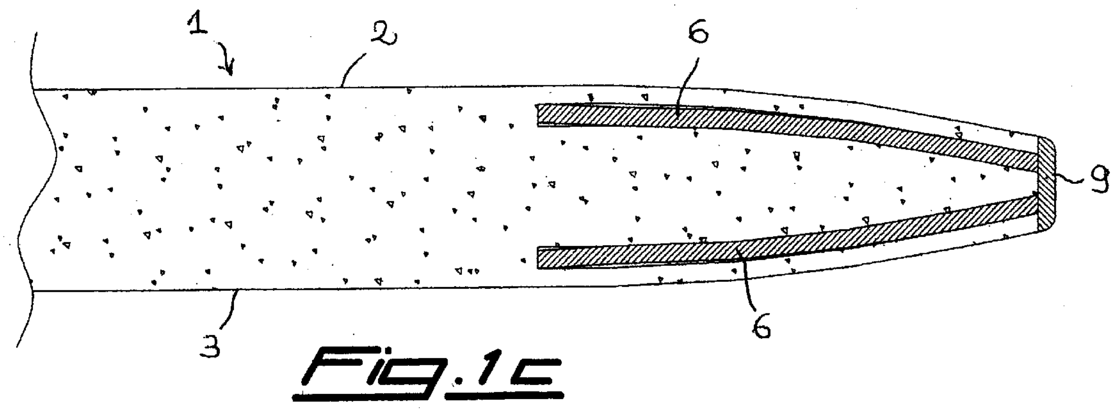
Figure 2:
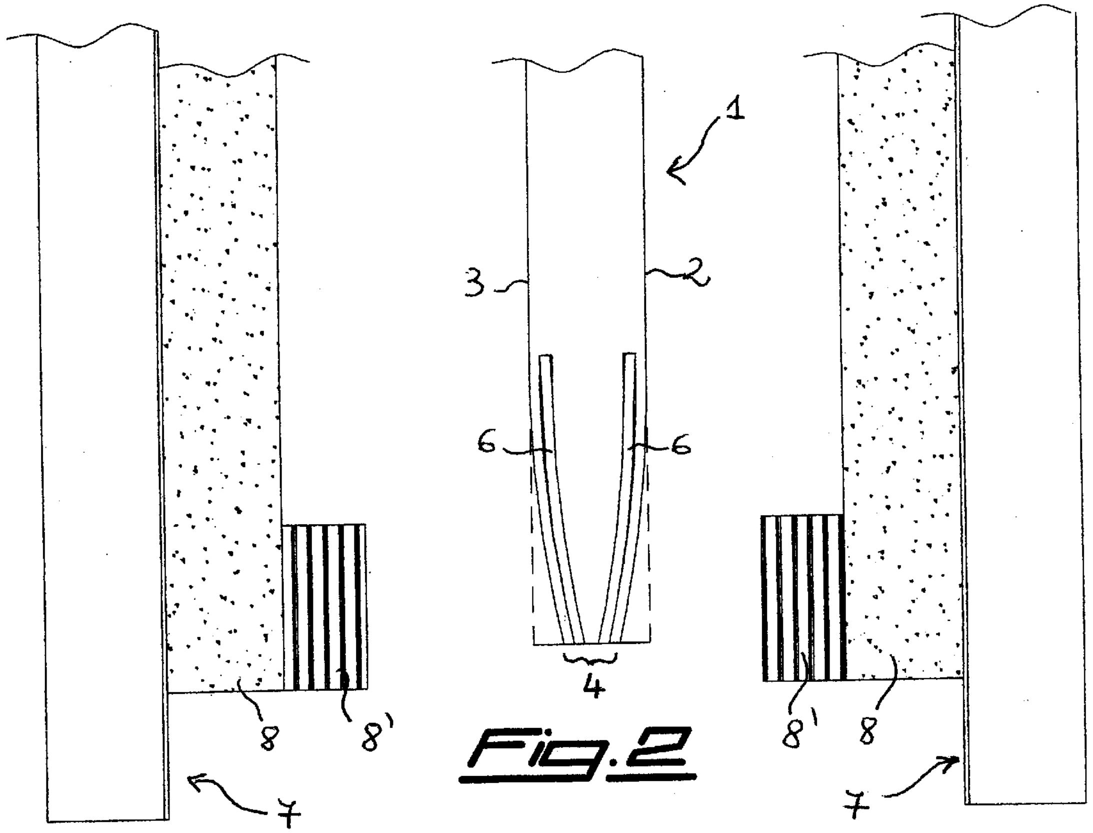
Figure 3:
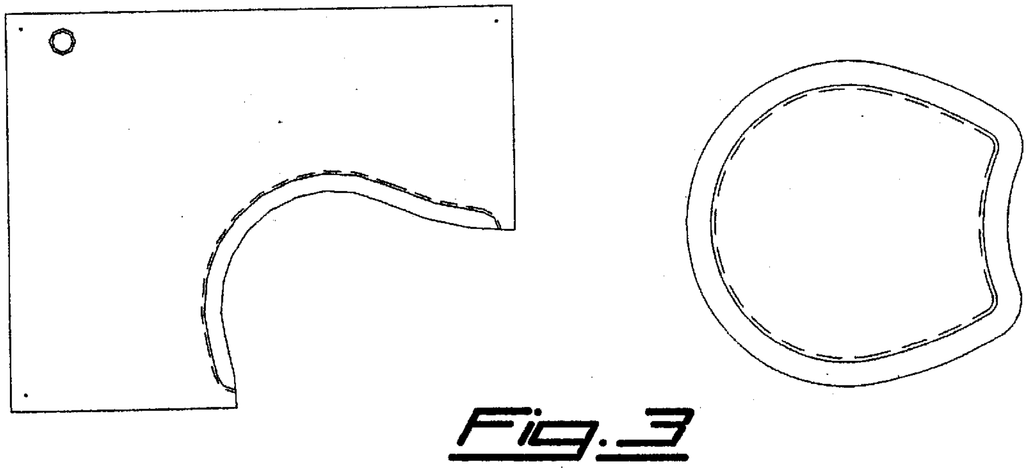

Further advantages and features of the process according to the present invention will be clear to those skilled in the art from the following detailed description of one of its embodiments with reference to the attached drawings wherein:

FIGS. 1*a*, 1*b* *e* 1*c* show the main steps of the process according to the present invention;

FIG. 2 shows an operative step of the process according to the present invention which leads to the stage of FIG. 1*c*; and FIG. 3 shows examples of bevelled boards obtainable through the process according to the present invention.

With reference to FIG. 1*a*, it can be seen that the process according to the present embodiment of the invention is carried out starting from a wood-chip board or a board in similar material 1, whose upper face 2 and lower face 3 can be already coated, for example with melamine papers. A first operative step of the process according to the present embodiment of the invention lies in making, on a side 4 of board 1 corresponding to the edge to be bevelled, at least two grooves 5 substantially parallel to each other and to the faces 2 and 3 of the board 1. These grooves 5 extend along the whole side of the edge of board 1 to be bevelled, and are preferably wedge-shaped, that is, they have an increasing thickness toward the exterior of the board.

Preferably, said grooves 5 are two and are limited by a flat wall, substantially parallel and very near to one of the faces of board 1, and from a curved wall, whose concavity is turned towards the center of the board itself.

For realization needs, the thickness of the grooves 5 does not end to zero toward the inside of the board 1, but to a minimum thickness which varies in relation to the tool used for carrying out the groove. For example, this minimum thickness can be about 3 mm. On the contrary, the maximum thickness of the grooves 5, at the side 4 of the board, and their depth depend on curvature radius of the edge to be bevelled and on the total number of grooves carried out. For example, for an edge with a curvature radius included between 300 and 400 mm grooves of deepness of about 70 mm can be carried out. In general, the lower is the curvature radius of the edge to be bevelled, the deeper are the grooves in such a way that the second operative step can be made without breaking the melamine papers which coat board 1.

Referring to FIG. 1*b*, it is shown that this second operative step of the process lies in introducing in each groove 5 an insert 6 of uniform thickness equal to the minimum thickness of the groove itself. Inserts 6 can be carried out with any material, for example they can be obtained from a board of lignocellulosic fibres, and have the function of preventing the chip and especially the melamine paper coating from breaking during the next operative step of the process. Another function of inserts 6 is to confer a bigger resistance to the bevelled sides of finished board 1.

As shown in FIG. 2, the following operative step of the process lies in the gluing and pressing of the walls of the grooves 5 on inserts 6. This operative step can be carried out for example by inserting the edge to be bevelled of the board 1 between the plates 7 of a press. Preferably, a press 7 of the type shown in figure, on which plates are applied elements 8 and 8' in spongy material and rubber sponge intended to prevent possible damages of the coating of faces 2 and 3.

FIG. 1*c* shows in section the edge of the board 1 bevelled through the process according to the present embodiment of the invention. As appears from this figure, to increase the resistance of the bevelled board, on side 4 a finishing fillet 9 in polymeric material can be applied. For instance, the application can be made by gluing with thermomelting glues of an ABS edge.

FIG. 3 shows that the process according to the present invention enables bevelling only a portion of the edge of a board, as well as the whole edge of a board of any shape.

Possible variations and/or additions can be made by those skilled in the art to the embodiment here described and illustrated without departing from the scope of the invention.

What is claimed is:

1. A process for bevelling an edge of a wood-chip board or a wood board, provided with two faces, characterized in that it comprises the operative steps of:

making at least two grooves along a whole area to be bevelled of the edge of the board, said grooves being substantially parallel to each other and to the faces, and having a thickness increasing toward the exterior of the board such that each of the grooves is limited by a flat wall, near to one of the faces of the board, and a curved wall with concavity turned towards the center of the board;

introducing into each groove an insert of uniform thickness equal to a minimum thickness of the same groove; and gluing an pressing the walls of the grooves on the inserts until each insert is in contact with the flat wall and curved wall of the groove.

2. A process according to claim 1, characterized in that there are two grooves.

3. A process according to claim 1, characterized in that said inserts are carried out with a material of lignocellulosic fibres.

4. A process according to claim 1, characterized in that after said gluing and pressing step, a finishing fillet of polymeric material is applied on the bevelled edge of the board.

5. A process according to claim 1, characterized in that said pressing is carried out by means of a press having a spongy material and rubber sponge thereon.

* * * * *